(12) United States Patent
Feng

(10) Patent No.: US 6,175,434 B1
(45) Date of Patent: Jan. 16, 2001

(54) ADAPTIVE INFRARED COMMUNICATION APPARATUS

(75) Inventor: Kai Di Feng, North York (CA)

(73) Assignee: International Business Machines Corporation, Armonk, NY (US)

( * ) Notice: Under 35 U.S.C. 154(b), the term of this patent shall be extended for 0 days.

(21) Appl. No.: 08/993,298

(22) Filed: Dec. 18, 1997

(51) Int. Cl.[7] .................................................. H04B 10/00
(52) U.S. Cl. ......................... 359/152; 359/153; 359/161; 359/172
(58) Field of Search .................................. 359/142, 143, 359/152, 153, 161, 172; 379/93.29, 100.02

(56) References Cited

U.S. PATENT DOCUMENTS

| | | | |
|---|---|---|---|
| 4,841,561 | * 6/1989 | Hill | 379/97 |
| 5,400,246 | * 3/1995 | Wilson et al. | 364/146 |
| 5,644,576 | * 7/1997 | Bauchot et al. | 370/437 |
| 5,652,668 | * 7/1997 | Aulet et al. | 359/110 |
| 5,808,760 | * 9/1998 | Gfeller | 359/110 |
| 5,970,062 | * 10/1999 | Bauchot | 370/345 |
| 6,021,186 | * 2/2000 | Suzuki et al. | 379/100.12 |

* cited by examiner

*Primary Examiner*—Huy D. Vu
*Assistant Examiner*—Dalzid Singh
(74) *Attorney, Agent, or Firm*—Douglas W. Cameron; Anne Vachon Dougherty

(57) ABSTRACT

An infrared communication device with an adaptive configuration controller for programming system parameter settings with command codes. The adaptive configuration controller comprises a number of shift registers and control circuits. The registers store command codes for configuring system parameters including bandwidth, sensitivity and LED drive current. The codes are obtained from an external source. The capability to program the system parameter settings allows the communication device to be adapted or reconfigured for optimal operation in response to changes in the environment without the need for removing or adding external components.

23 Claims, 4 Drawing Sheets

ADAPTIVE INFRARED COMMUNICATION APPARATUS

FIELD OF THE INVENTION

The present invention relates to a communication interface for a computer or mobile communication device, and more particularly to an infrared communication interface with adaptive configuration control.

BACKGROUND OF THE INVENTION

Infrared based systems have found widespread appeal in wireless communication systems including mobile point-to-point and LAN (Local Area Network) applications. Communication interconnections in a wireless communication system utilizing infrared are set up using infrared (IR) transceivers. A station, e.g. a personal computer (PC), notebook computer or mobile communication device, is connected/coupled to a transceiver. The infrared transceiver includes at least one infrared light emitting diode (LED), and typically comprises one or more photodiodes responsive to the output wavelength spectrum of the LED in the transceiver of the other party's communication station or device.

The performance and integrity of an infrared communication link will depend on the communication distance and communication protocol being utilized in addition to the operating environment, particularly the ambient light.

Known infrared communication transceivers comprise an infrared configuration controller and are typically implemented as one or more integrated circuits, i.e. chips. The configuration controller configures the system parameters such as bandwidth, sensitivity and drive current. In existing systems, external fixed components such as pull-up and pull-down resistors are utilized in conjunction with the configuration controller to set the system parameters, i.e. sensitivity, bandwidth, and drive current for the infrared light source (i.e. LED).

The known infrared communication chips suffer a number of drawbacks. First, it is difficult to optimize the infrared chip for operation on different communication protocols because one set of fixed external components sets the system parameters. Operation at a different communication protocol requires a new set of external components. For example, the well-known Apple Talk network communication protocol utilizes a conventional irDA chip and an external pull-down resistor of 2.7 kohm to set the optimal bandwidth. For other known IR communication protocols, a 130 kohm pull-down resistor is needed for optimum performance. One solution to this problem involves using one or more external analog switches for connecting/disconnecting the resistors. The drawback with this approach is the increase in footprint and larger PCB size required. Any increase in size is impractical for most applications, particularly a PCMCIA card.

Another problem with existing systems is the inability to change the system parameters "on-line", i.e. without changing the hard-wired or 'jumpered' resistors. However, in practical applications the infrared communication system is called on to handle various operational environments. For example for an infrared mobile telephone the communication distance may vary from 1 cm to more than 1 meter, and the input signal amplitude range can span 5 orders. The problem which arises is the difficulty of finding a set of system parameters which meet the requirements for the various operational environments. In known systems, the LED driving current is typically set to the value which meets the requirement of the maximum communication distance. If the infrared communication interface is not operated at the maximum communication distance, then a wastage of electrical power results. In addition, the receiver becomes saturated when the actual communication distance is less than the maximum. For example, known infrared transceivers in an Apple Talk-based network can achieve a maximum distance of more than 1.5 meters, but at a distance of around 20 cm, a fading zone of 4 cm exists due to the very strong input optical signal. To eliminate the fading zone, the sensitivity control resistor must be changed from 162 kohm to 1.8 kohm. However, the maximum communication distance is also reduced from 1.5 meters to 0.56 meters. Thus, adapting the transceiver to short communication distances to eliminate the fading zone also eliminates the ability to operate at larger distances.

Another problem with existing infrared communication chips is the inherent unsuitability to automatic chip testing. Often it is desired to test the chips based on customer requests or quality requirements in order to find the optimal setting for some special communication conditions. To determine the optimal operational requirements, a set of external resistors are soldered to the PCB and connected to the infrared communication chip. The chip is then tested, and if not acceptable, the resistors are removed and a new set are installed and the test is repeated. It will be appreciated that this is a tedious and time-consuming exercise better suited to an automated system.

The present invention addresses these disadvantages and shortcomings with the prior art.

BRIEF SUMMARY OF THE INVENTION

The present invention provides an adaptive infrared communication configuration controller having the capability for setting the system parameter settings internally using command codes or words. The programming of the internal system parameter settings allows the communication chip to be adapted or reconfigured for optimal operation in response to changes in the environment without the need for removing or adding external components such as resistors.

In a preferred embodiment, the adaptive infrared communication configuration controller includes a number of shift registers which store the command codes for configuring the system parameters. The command codes are obtained from an external controller, e.g. a control routine in the notebook computer or mobile communication device, and the operating parameters of the infrared configuration controller are changed by inputting new command codes.

In one aspect, the present invention provides a communication apparatus for a wireless communication channel, said apparatus comprising: (a) a transmitter having means for transmitting information over said communication channel; (b) a receiver having means for receiving information from said communication channel; (c) a configuration controller having means for setting system parameters for said communication channel, said configuration controller having means for receiving command words for setting said system parameters.

In another aspect, the present invention provides an infrared communication apparatus for a bidirectional infrared communication channel, said communication apparatus having a transmitter for transmitting information over the communication channel and a receiver for receiving information from the communication channel, and said infrared communication apparatus comprising: a configuration controller having a plurality of programmable circuits for setting system parameters for the communication channel, and said programmable circuits having means responsive to command words for defining said system parameters.

BRIEF DESCRIPTION OF THE DRAWINGS

Reference will now be made to the accompanying drawings which show by example a preferred embodiment of the present invention, in which.

DETAILED DESCRIPTION OF THE PREFERRED EMBODIMENT

Figure 1:
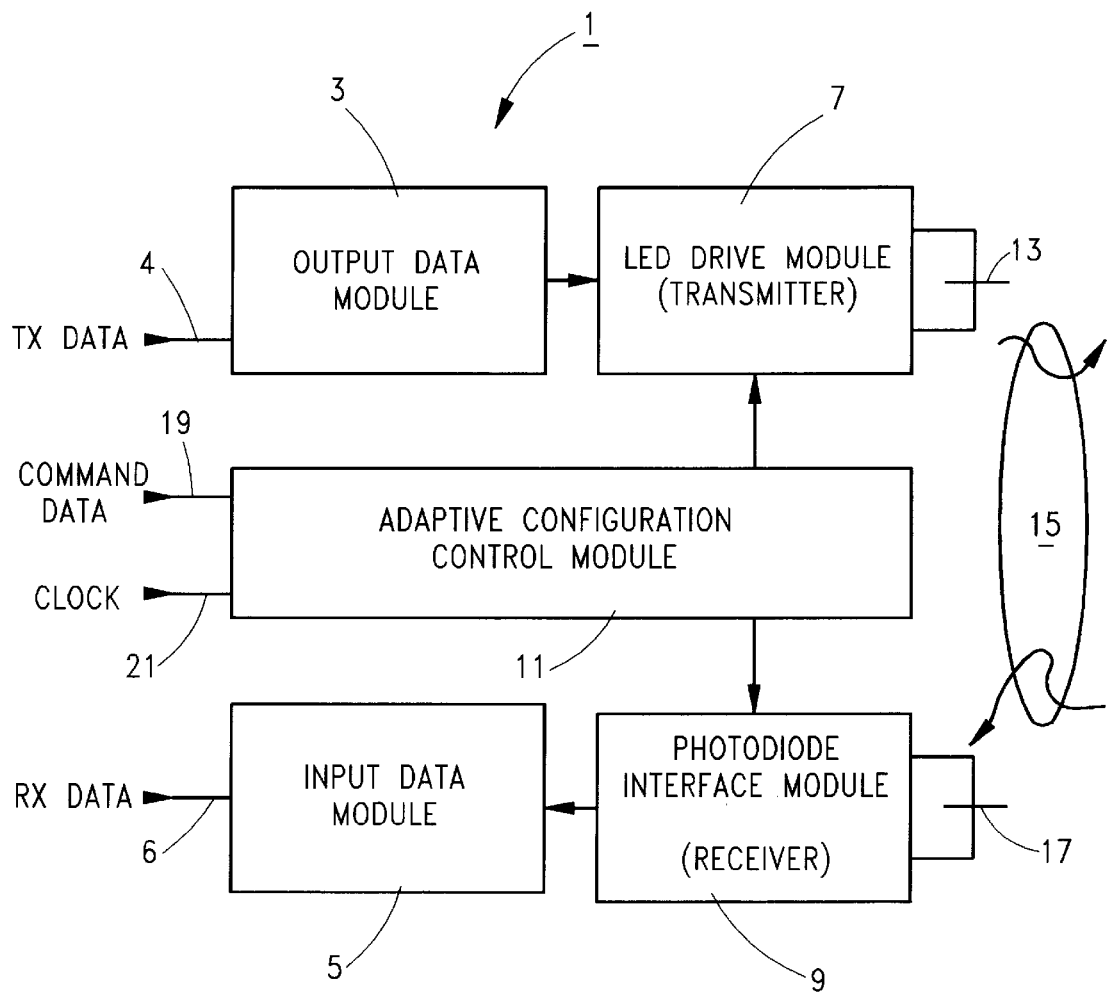
FIG. 1 is a block diagram showing an adaptive infrared communication device with an adaptive configuration controller according to the present invention.

Reference is first made to FIG. 1 which shows an infrared communication device with an adaptive configuration controller according to the present invention and indicated generally by reference 1. The infrared communication device 1 is preferably fabricated as a monolithic integrated circuit in a single package in order to achieve a compact footprint on a PCB (Printed Circuit Board—not shown).

As shown in FIG. 1, the infrared communication device or chip 1 comprises an output data module 3, an input data module 5, a LED (Light Emitting Diode) drive module 7, a photodiode interface module 9, and an adaptive configuration control module 11. The LED drive module 7 includes an infrared LED 13 which provides the light source in a transmit channel for an infrared communication link 15. The photodiode interface module 9 includes a photodiode 17 (or other suitable photosensor) which provides a receive channel for the infrared communication link 15.

The output data module 3 has an input 4 for transmit data (TX DATA) to be transmitted over the infrared communication link 15. The output data module 3 formats the TX DATA for the LED drive module 7 which transmits the data by pulsing the infrared LED 13 (through a LED trigger signal—FIG. 2(a)). The output data module 3 is implemented using conventional techniques as will be within the understanding of one skilled in the art.

The input data module 5 includes an output port 6 for outputting data (RX DATA) which is received over the infrared communication link 15. The RX DATA comprises digital data which is received by the photodiode 17 and amplified and reformed by the photodiode interface module 9. The input data module 5 takes the output data from the interface module 9 and puts it into the format for the RX DATA. The input data module 5 and the photodiode interface module 9 are implemented in known manner as will be within the understanding of one skilled in the art.

As shown in FIG. 1, the adaptive configuration control module 11 is coupled to the LED drive module 7 and the photodiode interface module 9. The configuration control module 11 has a command word input port 19 and a clock input 21. As will be described, the adaptive configuration control module 11 provides a programmable interface for programming the system configuration parameters of the device 1. The programmable parameters include sensitivity, bandwidth, and LED drive current.

Figure 2A:
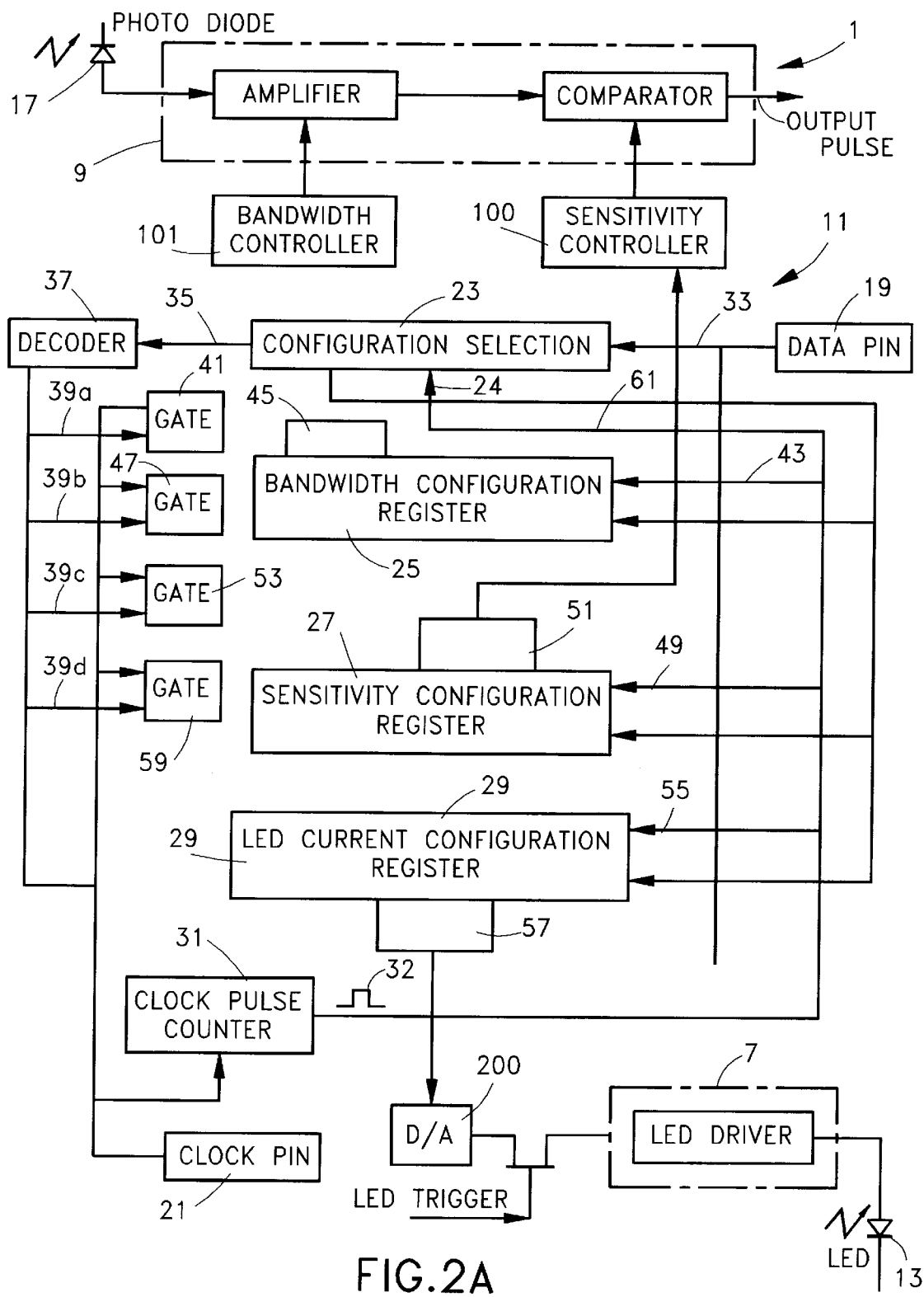
FIG. 2(a) is a block diagram showing the adaptive configuration controller in more detail.

Reference is next made to FIG. 2(a) which shows the adaptive configuration control module 11 according to the present invention in more detail.

As shown in FIG. 2(a), the adaptive configuration control module 11 comprises a configuration selection register 23, a bandwidth configuration register 25, a sensitivity configuration register 27, a LED current configuration register 29 and a clock pulse counter 31. The data input port 19 provides an input to the configuration selection register 23, the bandwidth configuration register 25, the sensitivity configuration register 27 and the LED current configuration register 29.

The configuration selection register 23 has a data input port 33 and a data output port 35. The data input port 33 is a serial input which is connected to the data pin 19 and data is shifted into the register 23. The data output port 35 comprises multiple parallel lines which are coupled to a decoder module 37.

The decoder module 37 comprises a logic circuit which decodes the contents of the configuration register 23 and generates an enable signal for selectively enabling one of the configuration registers 23, 25, 27, 29. The selection of the register 23, 25, 27 or 29 is based on the content of the command data contained in the configuration selection register 23. As shown in FIG. 2(a), the decoder module 37 has output lines 39a, 39b, 39c, 39d. The decoder output line 39a provides the enable input to gate 41 for the configuration selection register 23. The other input of the gate 41 is connected to the clock pin 21. The gate 41 is implemented to perform a logical AND function. Command data is shifted into the configuration register 23 when the decoder output line 39a is enabled and clock pulses are applied to the gate 41. The configuration selection register 23 also has an input 24 which is connected to the output of the clock pulse counter 31. The clock pulse counter 31 generates an output pulse 32 after a predetermined number of clock pulses (e.g. 4) have been reached which indicates the end of the command word. The output pulse 32 from the counter 31 controls the configuration selection register 23 as described with reference to FIG. 2(b).

Figure 2B:
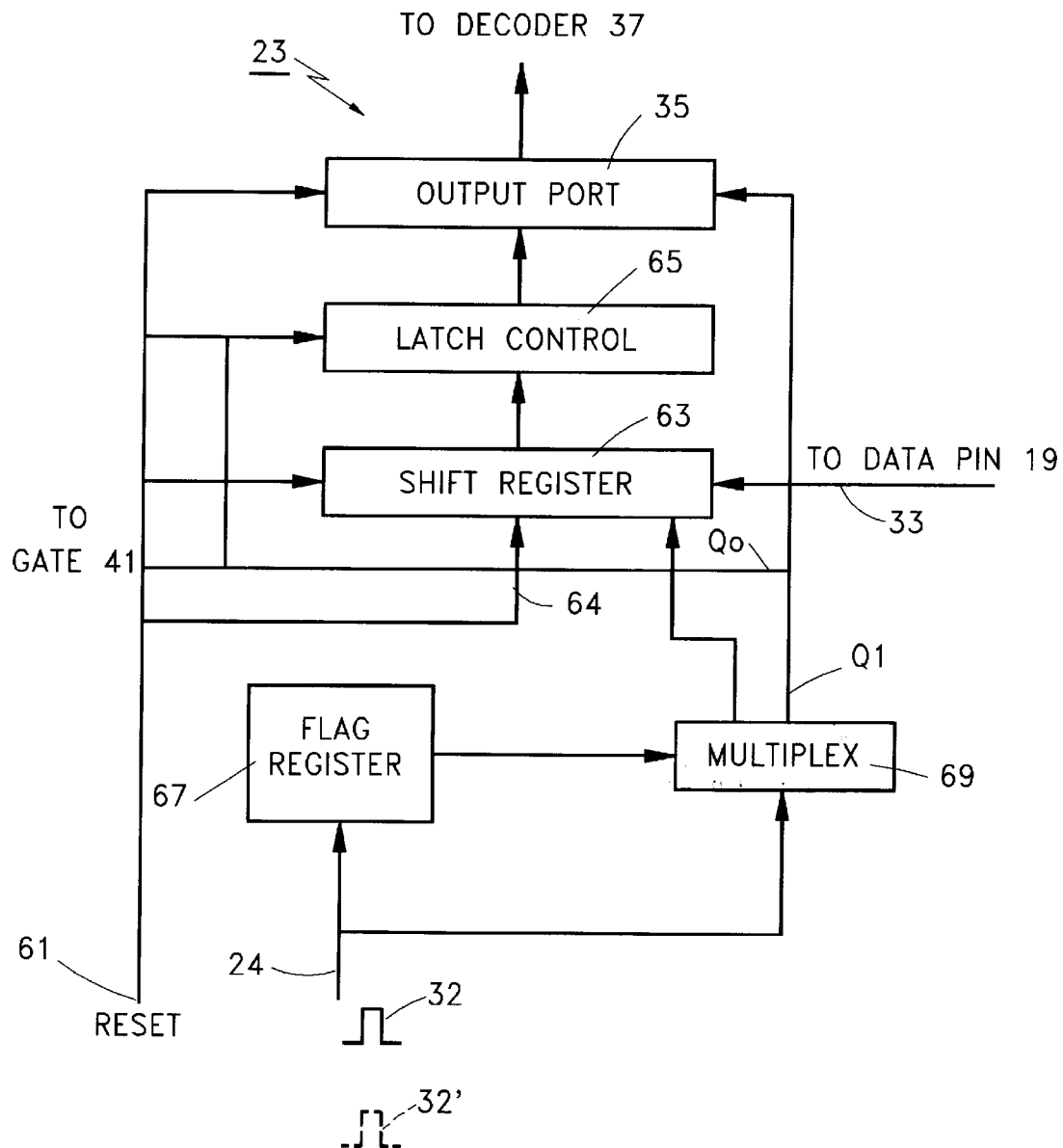
FIG. 2(b) is a block diagram showing the configuration selection register for the adaptive configuration controller of FIG. 2(a)

As shown in FIG. 2(b), the configuration selection register 23 comprises a shift register 63, a latch control 65, a flag register 67 and a 1×2 digital multiplexer 69. The input of the shift register 63 is coupled to the data pin 19 through the input port 33, and the shift register 63 has an enable input 64 which is connected to the output of gate 41. The output of the shift register 63 is coupled to the output port 35 through the latch control 65. The input of the multiplexer 69 receives the output pulses 32 from the counter 31 and the flag register 67 routes the pulses 32 between output Q0 and output Q1 of the multiplexer 69. The output Q0 of the multiplexer 69 is connected to the enable input for the latch control 65. The other output Q1 of the multiplexer 69 provides an internal reset input to the shift register 63 and the output port 35.

When a power-on reset signal is applied to the reset pin 61, the shift register 63, the flag register 67 and the output port 35 are reset, i.e. to zero. The flag register 67 receives the output pulses 32 from the clock pulse counter 31 and controls the multiplexer 69. The flag register 67 is sensitive to the falling edge of the pulses from the counter 31. After a reset, the flag register 67 directs the output pulse 32 from the clock pulse counter 31 to output Q0 of the multiplexer 69 which is connected to the trigger input of the latch control 65 and results in the contents of the shift register 63 being latched to the output port 35. The updated signals at the output port 35 are then decoded by the decoder 37. During the falling edge of the output pulse 32, the output of the flag register 67 is toggled and the output Q1 of the multiplexer 69 is activated, so that the next output pulse 32' (which will be generated upon receipt of the configuration word) resets the shift register 63 and the output port 35. On the falling edge of the output pulse 32', the flag register 67 is toggled to select output Q0 of the multiplexer 69. In this way, the configuration selection register 23 is enabled (through gate 41) for receiving the next configuration word after a power-on reset condition or after one of the registers 25, 27 or 29 has received a configuration word.

Referring back to FIG. 2(a), the bandwidth configuration register 25 has a serial data input 43 and a data output port 45. The data output port 45 comprises a parallel output port which is coupled to a bandwidth control circuit 101 for adjusting bandwidth. The contents, i.e. command word, of the register 25 are applied to the output port 45 and this aspect is described in more detail below. As shown in FIG. 2(a), the serial data input 43 is connected to the data pin 19, and command data is serially shifted into the register 25 through the operation of an AND gate 47. One input of the gate 47 is connected to the decoder output 39b and the other input is connected to the clock pin 21. The clock pulse counter 31 counts the clock pulses and generates an output pulse 32 when the configuration word length for the command data is reached. The output pulse 32 is applied to the input 24 of the configuration selection register 23 and as described above the contents of the register 23 are reset, i.e. command word equals zero, which in turn activates decoder output line 39a. This ensures that the next command word will be received by the configuration selection register 23.

The sensitivity configuration register 27 has a serial data input port 49 and a data output port 51. The data input port 49 is connected to the data pin 19. Command data is shifted into the sensitivity configuration register 27 through the operation of gate 53 which is coupled to decoder output line 39c and the clock pin 21. The data output port 51 of the sensitivity configuration register 27 is coupled to a sensitivity control circuit as described below with reference to FIG. 3.

Similarly, the LED configuration register 29 has a serial data input 55 and a data output port 57. The data output port 57 is coupled a control circuit for the LED (as described below with reference to FIG. 4). The serial data output port 55 is connected to the data pin 19. Command data for setting the intensity of the LED 13 (FIG. 1) is shifted into the register 29 through the operation of the gate 59 which is connected to decoder output line 39d and the clock pin 21.

As shown in FIG. 2(a), the adaptive configuration control module 11 also includes a reset input 61. The reset input 61 receives a reset pulse from power-on reset circuitry (not shown) and this pulse clears the configuration selection register 23 and the sets the bandwidth configuration register 25, the sensitivity configuration register 27 and the LED current configuration register 29 to default values. For example, the default LED drive current may be set to a maximum value. Clearing the configuration selection register 23 ensures that the next command word to be received goes to the selection register 23 as described above.

The command data which is shifted into each of the configuration registers 25, 27, 29 comprises the internal system configuration parameter settings. According to this aspect of the present invention, the system configuration parameter settings are set or programmed by command words supplied to the device 1 and the system configuration parameters may be changed on-line by downloading new command words.

Figure 3:
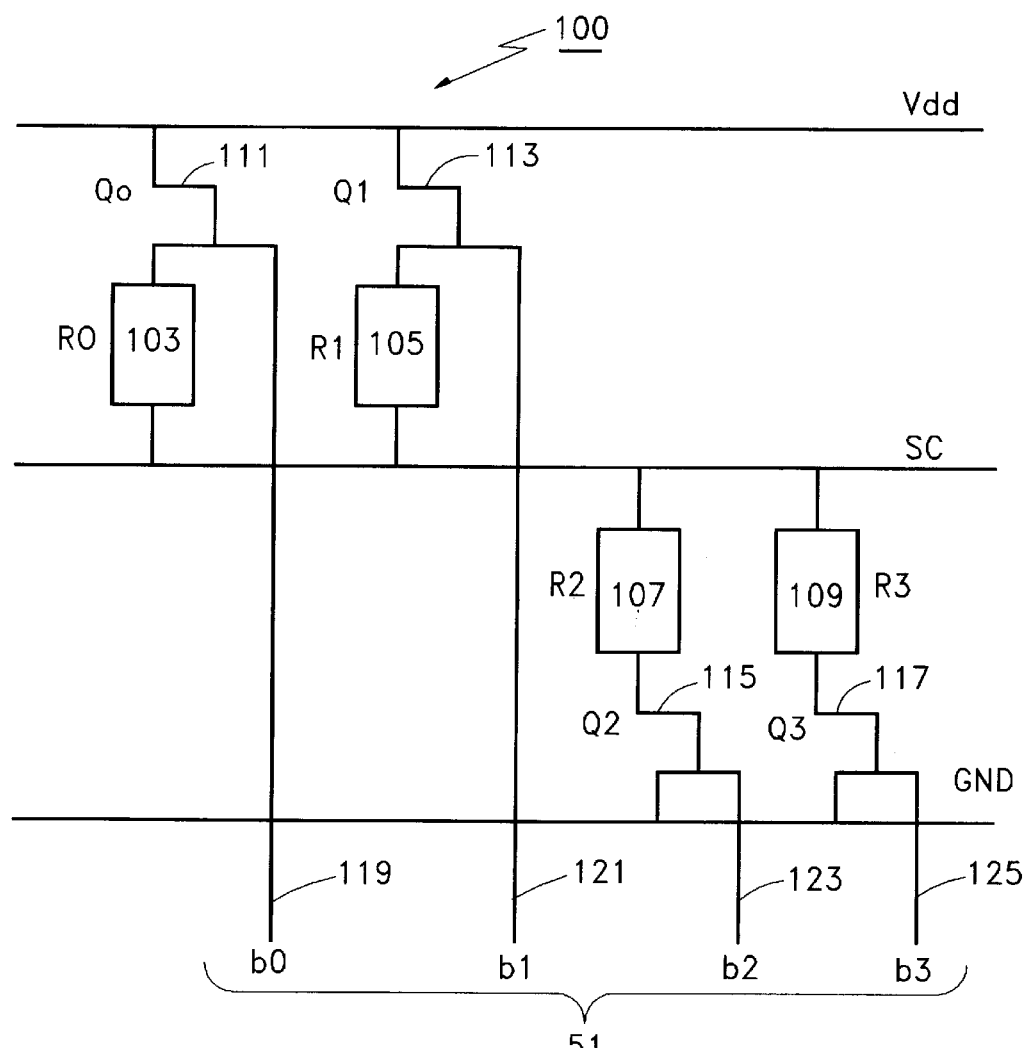
FIG. 3 shows a sensitivity control circuit for the adaptive configuration controller of FIG. 2(a)

Reference is made to FIG. 3 which shows a control circuit 100 for setting sensitivity. The sensitivity control circuit 100 comprises first and second resistors 103, 105 and third and fourth resistors 107, 109. The first and second resistors 103, 105 comprise pull-up resistors and are coupled to a voltage rail Vdd through respective field effect transistors (FET) 111, 113. The third and fourth resistors 107, 109 comprise pull-down resistors and coupled to ground GND through respective field effect transistors 115, 117. The transistors 111, 113 comprise P-type FET's and the transistors 115, 117 comprise N-type PET's. The gates of the FET's 111, 113, 115, 117 are connected to respective control lines 119, 121, 123, 125. The control lines 119, 121, 123, 125 are connected to respective bit lines or cells b0, b1, b2, b3 in the output port 51 for the sensitivity configuration register 27. The bit-lines b0, b1, b2, b3 comprise the command word, and the resistors are selected by turning on the respective FET by biasing the gate, for example, resistor 107 is activated by setting bit-line b2 to HIGH. According to this aspect of the invention, the command data or configuration word comprising bits b0, b1, b2, b3 control the sensitivity of the device 1 without the need for the addition or removal of external resistors.

The control circuit 101 for setting the bandwidth is implemented in a similar fashion to the sensitivity control circuit described in FIG. 3. The bandwidth is programmed by the bit settings in the configuration word stored in the bandwidth configuration register 25.

Figure 4:
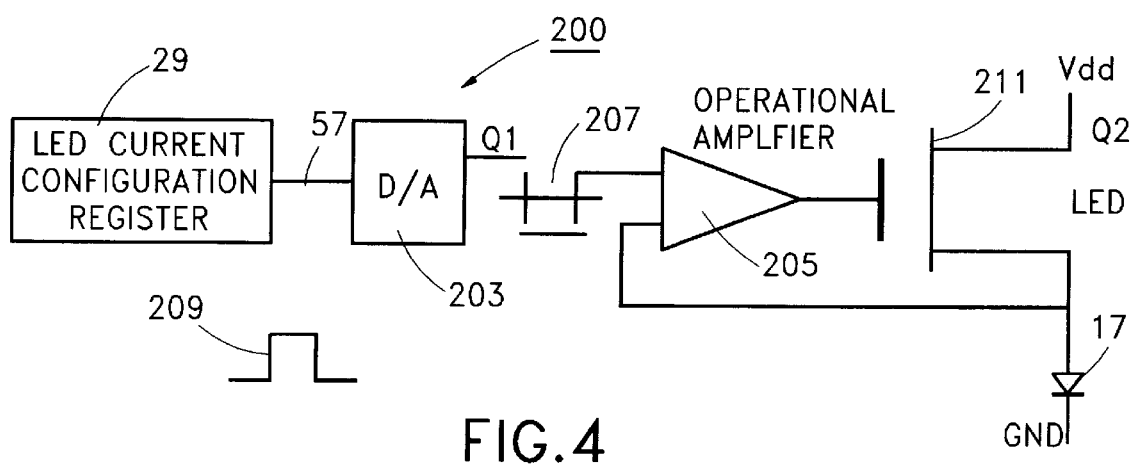
FIG. 4 shows a LED drive current control circuit for the adaptive configuration controller of FIG. 2(a).

Reference is next made to FIG. 4 which shows a control circuit 200 for setting the drive current for the LED 17 (FIG. 1). The LED drive current is controlled by the configuration word stored in the LED configuration register 29. As shown in FIG. 4, the control circuit 200 comprises a digital-to-analog (D/A) convertor 203 and the LED driver 7 includes an operational amplifier 205. The digital input of the D/A convertor 203 is coupled to the output port 57 of the LED configuration register 29. The D/A convertor 203 converts the digital configuration word into an analog signal which forms an input to the operational amplifier 205. The analog output from the D/A convertor 203 is coupled to the operational amplifier 205 through a FET 207. The gate of the FET 207 is controlled by a control pulse 209 (LED trigger) which controls the excitation of the LED 17. The output of the operational amplifier 205 is coupled to the infrared LED 17 through a drive (FET) transistor 211. The drive current to the LED 17 is determined by the digital value of the configuration word.

In operation, when the device 1 is first powered-up, the configuration registers 25, 27, 29 are set to the default values and the configuration selection register 23 is reset to zero. The decoder 37 decodes the "zero" value in the configuration selection register 23 to activate the decode output line 39a, while the remaining decode output lines 39b, 39c, 39d remain inactive. This ensures that the next command word is received by the configuration selection register 23.

To change a configuration parameter, for example, the drive current for the LED 13, the command word for selecting the LED current configuration register 29 is loaded into the configuration selection register 23. The decoder 37 decodes the command word in the selection register 23 and activates the decode output line 39d for gate 59. The command word containing the drive current setting is subsequently shifted into the LED current register 55 from the data pin 19 on each successive clock pulse applied to the clock pin 21. The clock pulse counter 31 counts the clock pulses and issues an output pulse 32 when the configuration word length is reached. The output pulse 32 from the counter 31 resets the configuration selection register 23 and causes the decoder 37 to deactivate the decode output line 39d to the LED current register 29 and active the decode output line 39a to the selection register 23. This enables the gate 41 to the selection register 23 so that the next command word will be shifted into the configuration selection register 23.

According to another aspect of the invention, the device 1 is programmed prior to starting a protocol by sending a set of predetermined system parameters to the configuration registers 23, 25, 27, 29. This features allows that the device 1 to be set for optimal operation for the communication protocol being utilized. Similarly, if during an infrared communication operation, there is a change of some environmental condition beyond an allowable tolerance, then the system configuration parameter setting(s) are adjusted on-line to accommodate the change in the communication environment. For example, the communication distance is getting shorter, the LED driving current should be decreased to avoid saturation. This kind of adaptation is easily implemented by changing the command word for LED drive current as described above.

Since the contents of configuration words can be changed by software, it is easy to incrementally scan the contents from the minimum value to the maximum to find out the best value or the best combination for certain application conditions. This feature also makes the device 1 suitable for automatic testing procedures.

The present invention may be embodied in other specific forms without departing from the spirit or essential characteristics thereof. Therefore, the presently described embodiments are considered to be illustrative and not restrictive, the scope of the invention being indicated by the appended claims rather than the foregoing description, and all changes which come within the spirit and scope of equivalency of the claims are therefore intended to be embraced herein.

Having thus described our invention, what we claim a new and desire to secure by Letters Patent is:

1. An adaptive configuration communication apparatus for a wireless communication channel, said apparatus comprising:
   (a) a transmitter having means for transmitting information over said communication channel;
   (b) a receiver having means for receiving information from said communication channel;
   (c) a controller having means for setting configuration parameters for said communication channel, said controller having means for receiving command words for setting said configuration parameters, means for adjusting the bandwidth of said means for receiving information,
   wherein said means for receiving comprises a photodiode and an amplifier for amplifying the output of said photodiode, and said means for adjusting the bandwidth comprises a plurality of resistors and means for selectively coupling one or more said resistors to said amplifier.

2. The adaptive configuration communication apparatus as claimed in claim 1, wherein said controller includes means for adjusting the sensitivity of said means for receiving information.

3. The adaptive configuration communication apparatus as claimed in claim 1, wherein said controller includes means for setting the output level of said means for transmitting.

4. The adaptive configuration communication apparatus as claimed in claim 3, wherein said means for transmitting comprises an infrared light source and said means for setting the output level comprises a circuit for setting the drive current to said light source.

5. The adaptive configuration communication apparatus as claimed in claim 4, wherein said drive current circuit comprises a digital to analog converter having an analog output for driving said light source and a digital input, and a register for storing a digital value for input to said digital to analog converter, and said digital value being defined by a command word.

6. The adaptive configuration communication apparatus as claimed in claim 1, wherein said means for selectively coupling comprises a shift register having a plurality of cells and said cells being coupled to switches responsive to the state of said cells, said switches being connected to said resistors, and the state of said cells being determined by a command word.

7. An adaptive configuration communication apparatus for a wireless communication channel, said apparatus comprising:
   (a) a transmitter having means for transmitting information over said communication channel;
   (b) a receiver having means for receiving information from said communication channel;
   (c) a controller having means for setting configuration parameters for said communication channel, said controller having means for receiving command words for setting said configuration parameters, means for adjusting the bandwidth of said means for receiving information,
   wherein said means for receiving comprises a photodiode, an amplifier for amplifying the output of said photodiode, and a comparator coupled to the output of said amplifier, and said means for adjusting the sensitivity comprises a plurality of resistors and means for selectively coupling one or more said resistors for setting a threshold input for said comparator.

8. The adaptive configuration communication apparatus as claimed in claim 7, wherein said means for selectively coupling comprises a shift register having a plurality of cells and said cells being coupled to switches responsive to the state of said cells, said switches being connected to said resistors, and the state of said cells being determined by a command word.

9. An infrared communication apparatus for a bidirectional infrared communication channel, said communication apparatus having a transmitter for transmitting information over the communication channel and a receiver for receiving information from the communication channel, said infrared communication apparatus comprising:
   (a) a configuration controller having a plurality of programmable circuits for setting system parameters for the communication channel;
   (b) said programmable circuits having means responsive to command words for setting said system parameters,
   wherein said programmable circuits comprise a sensitivity configuration circuit and wherein said means for setting said system parameters comprises a register for storing said command word and said command word defining a sensitivity setting, said register having an output port for outputting signals for controlling said sensitivity configuration circuit, said signals corresponding to contents of said command word.

10. The infrared communication apparatus as claimed in claim 9, wherein said programmable circuits comprise a bandwidth configuration circuit.

11. The infrared communication apparatus as claimed in claim 10, wherein said means for setting said system parameters comprises a register for storing said command word and said command word defining a bandwidth setting, said register having an output port for outputting signals for controlling said bandwidth configuration circuit, said signals corresponding to the contents of said command word.

12. The infrared communication apparatus as claimed in claim 9, wherein said programmable circuits comprise a drive current configuration circuit.

13. An infrared communication apparatus for a bidirectional infrared communication channel, said communication apparatus having a transmitter for transmitting information over the communication channel and a receiver for receiving information from the communication channel, said infrared communication apparatus comprising:

(a) a configuration controller having a plurality of programmable circuits for setting system parameters for the communication channel;

(b) said programmable circuits having means responsive to command words for setting said system parameters, wherein said programmable circuits comprise a drive current configuration circuit and wherein said means for setting said system parameters comprises a register for storing said command word and said command word defining a drive current setting, said register having an output port for outputting signals for controlling said drive current configuration circuit, said signals corresponding to contents of said command word.

14. A method for adaptively providing wireless channel communications in a system having a transmitter, receiver, and controller for setting configuration parameters for said channel comprising the steps of:

determining conditions for use of said system; and dynamically adjusting the bandwidth of said receiver in response to changes in said conditions wherein said receiver comprises a photodiode and an amplifier, said controller includes a plurality of resistors and wherein said adjusting comprises selectively coupling one or more of said resistors to said amplifier.

15. The method of claim 14 wherein said determining comprises receiving input regarding conditions for use.

16. The method of claim 14 wherein said determining comprises monitoring conditions during usage.

17. The method of claim 14 wherein said controller comprises programmable circuit means responsive to command words for setting said bandwidth.

18. The method of claim 14 wherein said dynamically adjusting comprises adjusting the sensitivity of said receiver.

19. The method of claim 18 wherein said receiver comprises a photodiode, an amplifier and a comparator and said controller includes a plurality of resistors and wherein said adjusting the sensitivity comprises selectively coupling one or more resistors for setting the threshold input to said comparator.

20. The method of claim 18 wherein said controller further comprises programmable circuit means responsive to command words for setting said sensitivity.

21. The method of claim 14 wherein said dynamically adjusting comprises setting the output level of said transmitter.

22. The method of claim 21 wherein said transmitter comprises an infrared light source and wherein said setting comprises altering the drive current to said light source.

23. The method of claim 21 wherein said controller further comprises programmable circuit means responsive to command words for altering said drive current levels.

* * * * *